Figure 6:
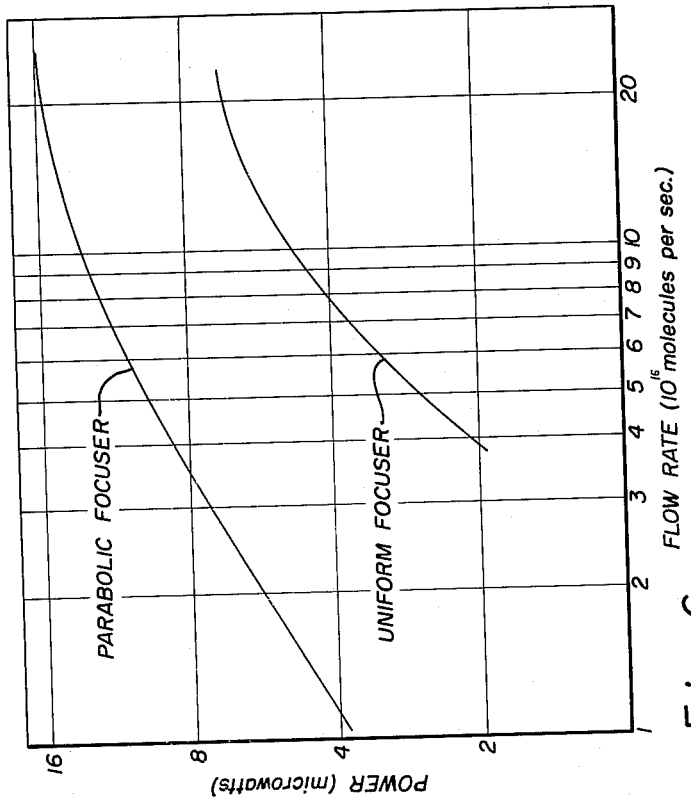

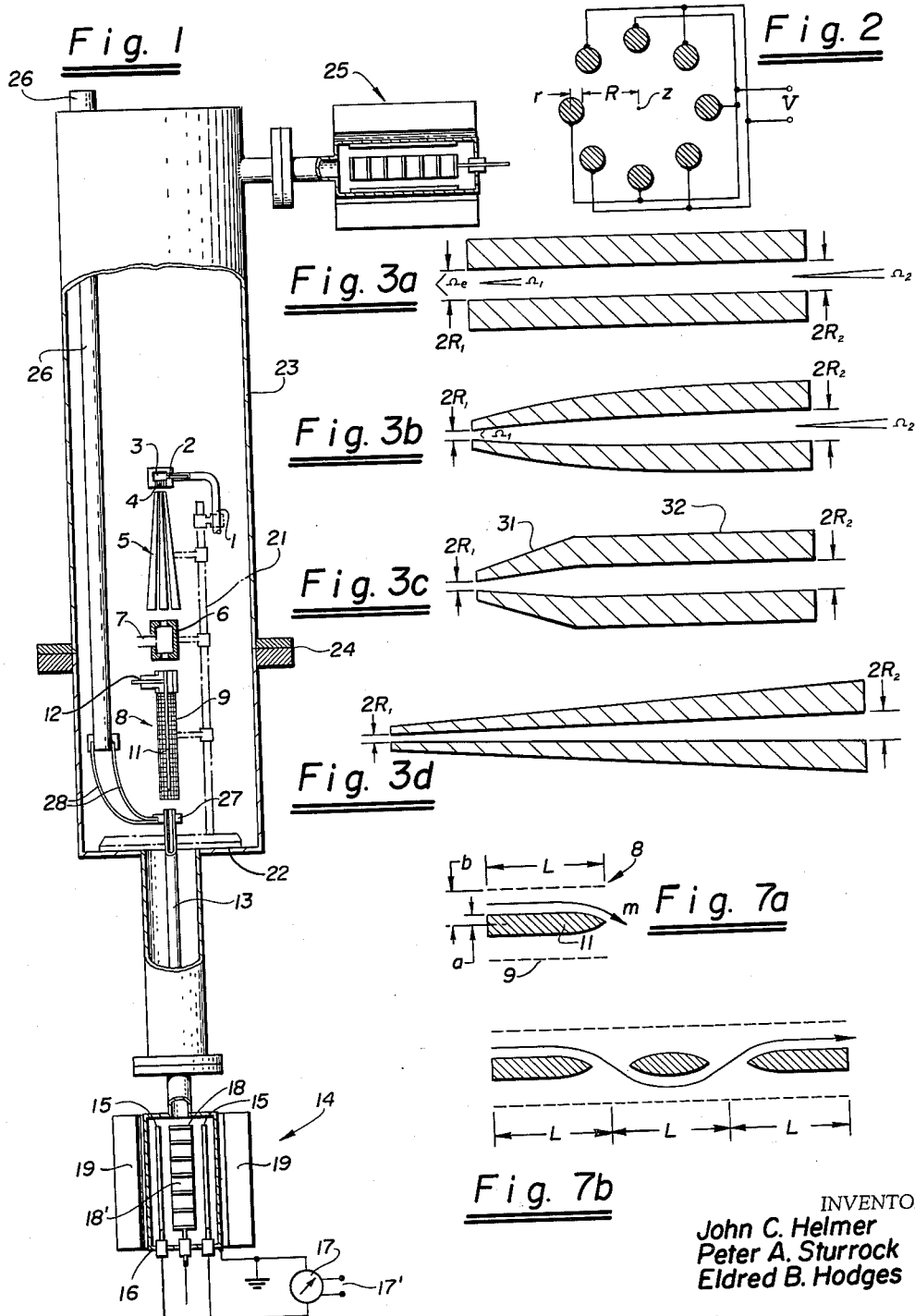

INVENTOR
John C. Helmer
Peter A. Sturrock
Eldred B. Hodges

BY Paul B. Hunter
ATTORNEY

United States Patent Office 3,214,630
Patented Oct. 26, 1965

3,214,630
MOLECULAR BEAM MASER
John C. Helmer, Palo Alto, and Peter A. Sturrock and Eldred B. Hodges, Los Altos, Calif., assignors to Varian Associates, San Carlos, Calif., a corporation of California
Filed Aug. 7, 1959, Ser. No. 832,346
32 Claims. (Cl. 315—5)

This invention relates to molecular beam masers, and more particularly to novel methods and apparatus for greatly improving the reliability, efficiency and flexibility of molecular beam masers in such applications as oscillators, frequency standards, frequency stabilizers, amplifiers, detectors and spectrometers.

The operation of a molecular beam maser is based on the existence of an extensive class of molecules which may exist in a plurality of quantum states or energy levels. Transitions of molecules from a higher to a lower energy level are accompanied by the emission of electromagnetic radiation photons of frequency corresponding to the difference in energy between such levels, the frequencies of greatest interest extending from the microwave region upwards into the submillimeter wave lengths. A beam of such molecules is successively directed through an upper state focuser where the relative number of molecules in the upper state is increased and then into a cavity resonator capable of supporting an electromagnetic radiation field of frequency corresponding to the separation of molecular energy levels. Interactions between upper state molecules and cavity fields of the proper frequency result in stimulated molecular transitions to lower energy levels thereby producing additional electromagnetic radiation.

As the flux of the molecular beam is increased beyond a critical value at which the power emitted from the beam at a certain transition frequency compensates for the cavity power losses, the maser will oscillate with an extremely high degree of stability at such transition frequency. In this way the maser may be used as precision frequency source, the transition frequency being determined primarily by the fundamental physical constants of the molecule. If the beam is operated somewhat below the critical flux, electromagnetic energy introduced into the cavity at the molecular transition frequency will stimulate the corresponding molecular transitions thereby enabling the maser to operate as a narrow band amplifier, such an amplifier having a low noise level due to the absence of charged particles and associated shot noise. Further, it is apparent that a maser operated just below the critical flux is useful as a sensitive detector of electromagnetic radiation at a transition frequency.

The maser may be used as a spectrometer by coupling an external power source of variable frequency to the cavity resonator. Resonance line signals are then obtained by monitoring the occurrence of stimulated molecular transitions as the power source passes through various transition frequencies. Conversely, an external power source may be stabilized to a particular transition frequency by a feed-back signal obtained in a known manner, for example, by a phase sensitive detector which senses and corrects any tendency of the source to drift from the transition frequency at which a condition of maximum resonance is obtained.

The practical utility of prior art masers has been found subject to a number of undesirable limitations. Among such limitations the following may be mentioned: (1) The molecular beam as it leaves the source, especially at high intensities, is not matched to the focuser; that is, the beam divergence at the source is greater than the solid angle of capture at the entrance aperture to the focuser, resulting in a waste of those molecules which leave the source at large angles and presenting difficult vacuum pumping and sealing problems, (2) The available beam intensities are significantly limited as a consequence of scattering collisions which destroy the beam in a region of high density directly in front of the effuser, thereby limiting the power output at a given transition and prohibiting the attainment of transitions having high critical beam fluxes, (3) Prior focuser constructions, using short leakage paths and high vapor pressure organic insulating materials such as plastic and rubber, are unable to support the intense electric field strengths required for optimum performance and further prohibit the attainment of a clean vacuum, (4) The detection of maser radiation by the conventional technique of coupling the cavity to a high frequency receiver becomes increasingly difficult the higher the transition frequency, (5) The minimum resonance line width available for spectrometers, frequency stabilizers and other high resolution applications is significantly limited in view of the fact that many molecules collide with the cavity wall and are exposed to the cavity field for a time which is correspondingly shorter than the transit time through the cavity.

Accordingly, it is the object of this invention to overcome these and other limitations in the prior art by providing a novel maser having a greatly improved reliability, efficiency and flexibility of operation.

One feature of the present invention is the provision of a novel molecular beam focusing technique which can be used, for example, to match a given angle of divergence at the focuser entrance aperture to a desired angle of acceptance at the focuser exit aperture.

Another feature of the present invention is the provision of a novel gas effuser for forming molecular beams of optimum intensity, said effuser being especially useful in combination with a focuser constructed in accordance with the techniques of the preceding paragraph.

Another feature of the present invention is the provision of a novel focuser construction characterized by a long leakage path for supporting intense electric fields, the absence of high vapor pressure materials, and interchangeable focusing rods which may be quickly secured with a high degree of dimensional accuracy.

A further feature of the present invention is the provision of a novel lower state focuser and detector placed downstream from the cavity resonator whereby stimulated transitions may be monitored without the use of a high frequency receiver and whereby the narrowness of resonance lines obtainable at the output of said detector is not limited by cavity wall collisions.

Figure 5:
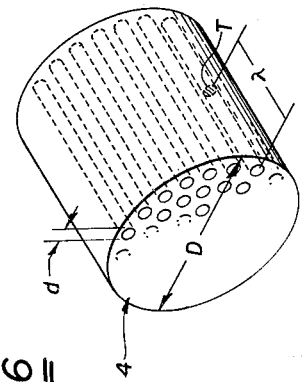
Figure 4:
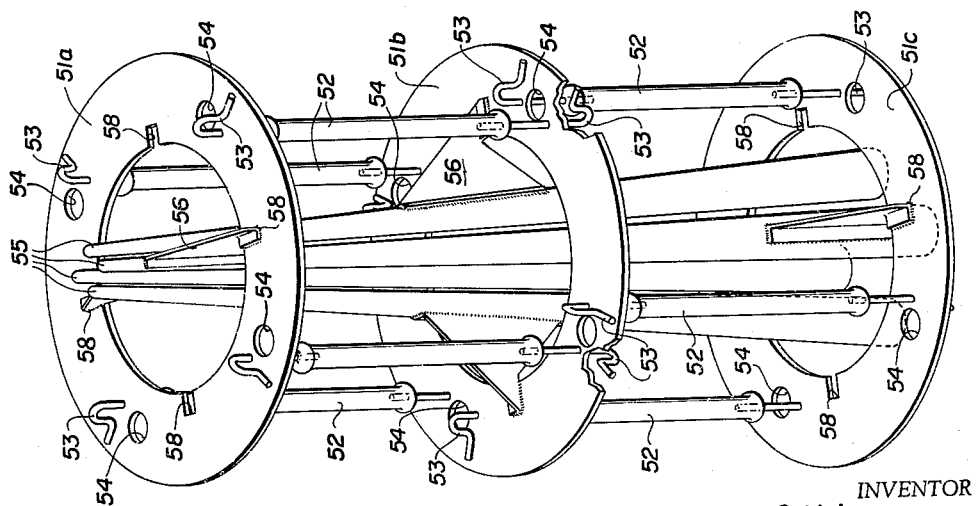

These and other features and advantages of the present invention will become more apparent upon a perusal of the following specification taken in connection with the accompanying drawings wherein, FIG. 1 is an elevational view, partly in cross section and partly schematic, of a molecular beam maser constructed in accordance with the present invention, FIG. 2 is a cross-sectional view of a multipole focuser, FIG. 3a is a cross-section of a known type of upper state focuser, FIG. 3b–3d are cross-sectional views of upper state focusers constructed in accordance with the present invention, FIG. 4 is an isometric view, partially broken away, of the novel focuser construction of the present invention, FIG. 5 is a magnified isometric view of the elements of a gas effuser, FIG. 6 is a plot of the power v. flow rate characteristics of a maser oscillator, demonstrating the advantages of an effuser-upper state focuser combination constructed in accordance with the present invention, and FIG. 7a and 7b are cross-sectional views of two forms of a lower state focuser constructed in accordance with the present invention.

The overall organization of a maser constructed in accordance with the present invention is shown in FIG. 1. A supply of beam forming material, ammonia gas in the present example, is fed through a supply line 1 into a diffusion chamber 3 formed in a metallic block 2. The gas streams out of chamber 3 in a molecular flow through a plurality of tubes within a gas effuser 4 positioned forward of chamber 3, thereby forming a longitudinally directed molecular beam containing a mixture of upper and lower state molecules. An upper state focuser 5 comprising four tapered and diverging focusing rods, described in detail with reference to FIG. 4, serves to select upper state molecules from the beam by defocusing lower state molecules through the spaces between the focusing rods and confining upper state molecules. The energy selected beam is then directed through a cavity resonator 6 wherein molecules may undergo stimulated transitions to a lower energy level or state. Electromagnetic energy may be coupled in or out of cavity resonator 6 through a waveguide 7. The molecular beam continues through a lower state focuser 8 having a grounded transparent outer conductor 9 as of wire screen and solid inner conductor 11 to which a high voltage is applied at terminal 12. As more fully explained with reference to FIG. 7a, lower state focuser 8 serves to defocus upper state molecules through transparent conductor 9 while directing lower state molecules through a long tube 13 into an ionization gauge 14.

Detector 14 is a high vacuum sputter pump of the type disclosed in the Review of Scientific Instruments, vol. 29, page 367 (May 1958), modified in that cathodes 15 are insulated from the grounded housing 16 and a current meter or other suitable indicator 17 is connected between the cathodes 15 and ground. A high voltage applied to anode 18 from a power supply grounded at the negative terminal (not shown) initiates a glow discharge in a magnetic field between the ends 19 of a small U-shaped magnet. The discharge current passing through meter 17 indicates the flux or pressure of the molecular beam leaving the lower state focuser 8. An electrical signal corresponding to this current may be provided at terminals 17'. By dividing the anode 18 into a plurality of small tubular cells 18', it is possible to obtain very substantial currents at low pressures. The novel provision of a floating potential cathode connected to ground through the current measuring means substantially eliminates leakage currents in the measuring means thereby permitting the attainment of very high sensitivity indications at 17, 17' of changes in the downstream concentration of lower state molecules and hence the occurrence of stimulated transitions in the cavity resonator 6.

Positive ions produced by the glow discharge are directed against the cathodes 15 which are made of a reactive material such as titanium. This reactive material is thereby sputtered on the interior surfaces of the discharge chamber where it serves to entrap gaseous molecules. Thus glow discharge device 14 additionally operates as a high vacuum pump which reduces the background pressure and keeps the entire system clean. It may be noted that satisfactory operation is obtained where only one cathode 15 is provided since the interior of housing on the opposite side of the anode will then serve as a second cathode in the production of a glow discharge.

A glow discharge device of the type just described is claimed in divisional application Serial No. 124,574, filed July 17, 1961.

Various components of the maser are fixedly secured by clamps to a post 21 mounted at the bottom 22 of the vacuum housing. The top 23 of the housing may thereby be put in place or removed for inspection without disengaging such elements. The two parts 22 and 23 of the housing are joined by means of a copper washer type vacuum seal at flange 24. Similar vacuum seals may be provided for the vacuum pumps, gas inlet, high voltage leads, waveguide and other structures communicating with the interior of the maser.

As will be subsequently described, the novel focuser of the present invention allows a significant reduction in the total flow of gas so that the speed of vacuum pumping required to maintain the background pressure at about $10^{-6}$ millimeters Hg is less than 100 liters per second. After the initial pressure has been reduced to about $10^{-2}$ millimeters Hg by means of a small forepump, the system may be sealed off and pumped solely by a small electrical vacuum pump 25 of the type described in the aforementioned Review of Scientific Instruments article.

A cold trap 26 consisting of a supply of liquid nitrogen contained in a stainless steel tube may be optionally included within the vacuum housing. The mouth 27 of tube 13 is then cooled through copper straps 28 so as to freeze out condensable molecules other than those entering the tube from the lower state focuser 9. This freezing, together with the directional selectivity available with entrance tubes of sufficient length, serves to reduce the background pressure and associated noise in the detector 14. Cold trap 26 further aids pump 25 in removing stray molecules and maintaining the necessary degree of vacuum.

The molecular beam focusing technique of the present invention can be understood by first considering the potential energy W of molecules in an electric field. For the molecules of interest in the present invention, this energy may usually be expressed by $W=\pm C|E|^2$ where $|E|$ is the absolute value of the electric field strength and C is the second order Stark effect coefficient. The potential energy is positive for upper state molecules and negative for lower state molecules. If a field is established across the cross-sectional dimension 2R of a molecular beam such that the radial variation in $|E|$ is monotonic from an initial value $|E_i|$ to a final value $|E_f|$, it follows from the nature of the potential energy function that molecules having a potential energy of one sign will be defocused from the beam whereas molecules having a potential energy of opposite sign will be focused in a periodic motion about the beam axis. Upper state focusing is provided where $|E|$ is radially increasing and lower state focusing is provided where $|E|$ is radially decreasing.

In the case of a uniform focusing field, that is one wherein both the cross-sectional field strength variation and the beam cross-section remain constant in the direction of the beam axis, the focused beam is characterized by a certain focusing period $T_0$ and solid angle of divergence $\Omega$ (within which are contained the velocity vectors of the focused molecules). Both $T_0$ and $\Omega$ are functions of the potential energy barrier $\Delta W = C(E_f|^2 - |E_i|^2)$ and may be expressed to a useful degree of accuracy by the following formulae:

$$T_0 = \zeta \frac{2\pi R}{\sqrt{\frac{2\Delta W}{m}}}, \quad \Omega = \pi \frac{\Delta W}{kT}$$

where $k$ is Boltzmann's constant, T is the absolute temperature of the source, $m$ is the molecular mass, and $\zeta$ is a field shape form factor on the order of unity. In the case of ammonia molecules a more precise formula, taking into account departures from the second order Stark effect at high field strengths, is $$\Omega = \frac{\pi h \nu}{2kT}\left[\sqrt{1 + \left(\frac{2MK}{J(J+1)}\right)^2 \left(\frac{E\mu_0}{h\nu}\right)^2} - 1\right]$$

where $\nu$ is the transition frequency of the focused molecules, $h$ is Planck's constant, J, K, M are the rotational quantum numbers of the molecule, $\mu_0$ is the molecular dipole moment, and $$E = \sqrt{\frac{\Delta W}{C}}$$

For example, in the case of ammonia molecules undergoing a $v=24$ $kMc$ transition, typical values are $T=300°$ K., $\mu_0=1.45$ Debye, $J=K=3$, $M=2$, so that a field E of 33,000 volts per centimeter yields a capture angle $\Omega$ of .0078 steradian.

Consider, now, a nonuniform focusing field which is divided up into a series of small segments of varying potential energy barrier $\Delta W$ and cross-sectional dimension $2R$; the initial segment having values $R_1$, $\Delta W_1$ and the final segment having values $R_2$, $\Delta W_2$ such that $R_1^2 \Omega_1 = R_2^2 \Omega_2$ where $\Omega_1$ and $\Omega_2$ are the divergences of a uniform focusing field of potential barrier $\Delta W_1$ and $\Delta W_2$, respectively. If the change in the focusing field from segment to segment is sufficiently small, the beam will remain substantially continuous as it passes through the focuser and the beam characteristics at a given segment will be the same as in a uniform focuser of identical cross-section. Otherwise stated, the change in the potential energy barrier $\Delta W$ must be adiabatic as the beam cross-section varies from $2R_1$ to $2R_2$ along the beam axis $z$. This adiabatic condition may be approximated to a useful degree of accuracy by the inequality $$\frac{dT_0}{dt} \leq 2\pi$$

where $t$ (the time elapsed after a molecule enters the focusing field) is equal to the $z$ coordinate divided by the axial velocity $v$. Since $v$ may be approximated by the most probably Maxwellian distribution velocity $$\sqrt{\frac{2kT}{m}}$$

the above inequality may be more conveniently expressed as $$\frac{dT}{dz} \leq 2\pi \sqrt{\frac{m}{2kT}}$$

Noting finally that the quantity $R^2\Omega$, determined by the volume of phase space occupied by the beam, remains constant for such continuous beams, it results that the described focusing technique enables an essentially lossless (maximum transmission) transformation of a beam characterized by values $R_1$, $\Omega_1$ into a beam characterized by values $R_2$, $\Omega_2$. Thus the present invention provides a novel and useful method for generally controlling the cross-section and divergence of a molecular beam. Many different focusing structures and electrode configurations for practicing this method will be apparent to those skilled in the art.

Referring to FIG. 2, there is shown a typical cross-section of a multipole focuser particularly useful in the practice of the described method with respect to upper state molecules. This consists of an even number $2n$ of poles having radius $r$ and disposed about the beam axis $z$ at a distance R, a voltage difference V of alternate sign being applied between adjacent poles. The electric field E increasingly varies in the radial direction $\rho$ from $E_i = 0$ at $\rho = 0$ to $$E_f = \frac{nV}{2R}$$

thereby forming a potential barrier $\Delta W = CE_f^2$ across the beam cross-section. The focusing period $T_0$ is then approximately $$\frac{2\pi R^2}{V\sqrt{\frac{2C}{m}}}$$

and the adiabatic condition may be expressed as $$\frac{d}{dz}\frac{R^2}{V} \leq \frac{n}{z}\sqrt{\frac{C}{kT}}$$

Although suitable focusers may be designed wherein both R and V are varied, the most convenient focuser in practice is one wherein focusing rods having a constant voltage but variable spacing are used. This structure has a further important advantage of enabling the attainment of higher field strengths before breakdown as the spacing between the rods is narrowed, especially when the diameter of the rods is varied in accordance with the spacing between rods as subsequently described. In the case of constant voltage rods, the adiabatic inequality may be restated as $$\frac{d}{dz}R^2 \leq \frac{nV}{2}\sqrt{\frac{C}{kT}}$$

The previously discussed focusing technique finds an important application with respect to upper state focusers of the type used in molecular beam masers for effecting a nonequilibrium population of upper state molecules. In FIG. 3a there is shown a uniform multipole focuser which has heretofore been used for this purpose. The disadvantageous limitations of such a focuser become apparent when it is considered that $R_1^2 \Omega_1 = R_2^2 \Omega_2$, where the subscripts 1 and 2 now denote values taken at the focuser entrance and exit apertures, respectively. The value of $R^2\Omega$ is generally determined by the consideration that $R_2$ should be about equal to the cross-sectional radius of the cavity resonator whereas $\Omega_2$ is made small in order to minimize wall collisions. In the case of a uniform focuser $\Omega_1 = \Omega_2$ so that $\Omega_1$ will also be small. However, for any practical gas source the solid angle $\Omega_e$ occupied by molecules leaving the effuser is much greater than the capture angle $\Omega_1$ so that only a fraction $\Omega_1/\Omega_e$ of the total number of molecules entering the maser are allowed to pass through the focuser. Since the total gas input is then proportional to $R_1^2 \Omega_e$, independent of $\Omega_1$, it follows that a continuous beam focuser which reduces $R_1$ while maintaining the same value of $\Omega_2$ permits a substantial reduction in gas input. It is apparent that such a focuser is realized when the previously discussed focusing method is used. A preferred apparatus for performing this method is the multipole focusing rod structure for which the adiabatic condition is represented by the previously developed inequality $$\frac{d}{dz}R^2 \leq \frac{nV}{z}\sqrt{\frac{C}{kT}}$$

The shortest focuser satisfying the stated inequality is one wherein the focusing elements lie on a paraboloid of revolution defined by the equation $$R^2 = \frac{z}{L}(R_2^2 - R_1^2) + R_1^2$$

where the length of the focuser in the $z$ direction is not less than a minimum value $$\frac{2}{n}\frac{(R_2^2 - R_1^2)}{V}\sqrt{\frac{kT}{C}}$$

Such a parabolic focuser is shown in FIG. 3b. The radius r of the focusing rods is preferably made variable according to the relationship $$r = \frac{R}{n-1}$$

in order to obtain the closest approximation to the theoretical equipotentials of a multipole field.

Although the beam focusing techniques of the present invention are applicable to multipole focusers in general, a quadropole focuser ($n=2$) is considered to be the most effective as well as the simplest configuration. In this regard it is to be noted that the radial variation in potential energy forms a harmonic potential well. As a consequence the properties of a given focuser design are more predictable because closely correlated with the developed theory; and, further, aberrations of the focusing system are minimized in the case of a substantial spread in molecular velocity. Also the ratio of upper state molecules focused to lower state molecules defocused per unit length is greater than with focusers of larger $n$ values, a fact of particular significance in maser applications. The minimum length of a quadropole focuser is approximated by $$\frac{R_2{}^2}{V}\sqrt{\frac{kT}{C}}$$

for $R_1$ small compared to $R_2$. This is about equal to the length of a quarter focusing period in a uniform focuser, which is the minimum length for such a focuser. For example, in the case of an ammonia beam, $$C=\frac{1}{h\nu}\left[\mu_0 \frac{MK}{J(J+1)}\right]^2$$

the minimum length is about ten inches for $T=300°$ K., $V=10$ Kv. and $R_2=.5$ cm. Thus it may be concluded that a parabolic quadrupole focuser of the same length as a corresponding uniform focuser and with the same applied potential difference V and exit aperture $R_2$ will produce identical exit beams for the same source intensity, but the total gas input is substantially reduced. This reduction will be greater, the smaller $R_1$. A practical limit is imposed by voltage breakdown at extremely close spacing and in some instances by significant changes in the electric field interaction of certain molecules, for example, linear molecules with small rotational constants, at very high field strengths.

It is quite difficult, in practice, to manufacture focusing rods into a parabolic shape. However, the configuration shown in FIG. 3c has been found to be adequate approximation and may be considered parabolic for purposes of the present invention. This focuser consists of a uniformly tapered section 31 having an interior slope equal to that of the corresponding parabola in FIG. 3b at the entrance aperture thereof and a uniform section 32 extending rearward of the point at which the interior radius of section 31 diverges to a value $R_2$.

Another convenient focuser satisfying the previously stated inequality as to $$\frac{d}{dz}R^2$$

is shown in FIG. 3d. Here the interior radius R diverges linearly from $R_1$ to $R_2$ over a length which is at least equal to a minimum length $$\frac{4}{n}\frac{R_2(R_2-R_1)}{V}\sqrt{\frac{kT}{C}}$$

This minimum length is greater than the minimum length of the corresponding parabolic focuser by a factor $$\frac{2R_2}{R_1+R_2}$$

and represents a situation wherein the interior slope is equal to that of the corresponding parabolic focuser 3b at the exit aperture thereof. Further the radius of each rod is uniformly tapered from $R_1$ to $R_2$ to match the theoretical equipotentials as previously mentioned. Although the linear focuser of FIG. 3d is somewhat longer than the corresponding parabolic focuser, it will usually be the most efficient configuration where the electric field strengths at the small end of the focuser are high enough to effect a substantial first order Stark effect.

Referring to FIG. 4 there is shown a novel focuser construction in accordance with the present invention. The supporting frame consists of three stainless steel washers 51a, 51b, 51c joined by a plurality of glass rods 52 which are terminated at each end by tungsten springs 53. Springs 53 extend short distance into the glass rods 52 and are spotwelded to washers 51 after having been bent to provide enough flexibility for absorbing small shocks without shearing the glass. Stainless steel focusing rods 55 are mechanically and electrically connected to washers 51 by means of radial fins 56 which are inserting in radial slots 58. As shown in FIG. 4, slots 58 are cut directly into washers 51. However, the difficulties of machining such slots may be avoided by alternatively spot welding a pair of inwardly directed ear members at the inner edge of the washer, each slot being formed by suitably spacing apart the edges of said ear members. One pair of alternate rods 55 is connected to washers 51a and 51c and the other pair is connected to washer 51b. The required focusing voltage differences are obtained by applying a high voltage to washer 51b and grounding washers 51a and 51c.

The focuser may be conveniently assembled by spacing washers 51 on a threaded rod passing through aligning holes 54. The tungsten springs 53 are then spot-welded in place, and the glass fused between them by conventional glassing techniques. The focusing rods are then jigged to a spline, which may, for example, be made of Bakelite and inserted into the frame. Next the rods are secured in washer slots 58 as by block tin soldering using a stainless steel flux and finally the spline is removed. A focuser assembled in this manner can meet very precise dimensional tolerances and is mechanically quite rigid. It should be particularly noted that the dimensional accuracy of the spacing between focuser rods is determined by the spline rather than the supporting frame, and the spline can be quite accurately machined to yield the desired spacing prior to the insertion of the rods.

Another important feature of the focuser of the present invention is that the leakage path through glass rods 52 is sufficiently long that the breakdown voltage is determined only by the spacing between the focusing rods. In an exemplary embodiment wherein the interior diameter of the focuser and the diameter of the individual focusing rods are uniformly tapered from .060″ to .300″ over a distance 4″, voltages in excess of 40 kv. can be supported. Since this construtcion uses no high vapor pressure materials, such as plastic or rubber, it is free from out-gasing effects which would prohibit the attainment of a high vacuum with small electrical sputter pumps of the type shown in FIG. 1. Finally, it is to be noted that rapid changing of the focuser rods is possible by unsoldering the focusing rod assembly and jigging and soldering in a new one. Additional radial slots 58 may be provided to accommodate a focuser having more than four rods. In this case, alternate rods will be connected to high voltage washer 51b and the other set of alternate rods will be connected to grounded washers 51a and 51c.

Referring now to FIG. 5 there is shown a magnified view of a gas effuser 4 comprising a plurality of small tubes of diameter $d$ contained in a bundle of diameter D. Gas is supplied to the rear face of the effuser at sufficient pressure to enter the tubes in a viscous flow. A transition to a streamlined molecular flow occurs at a position T along the tube such that the pressure has dropped to a value at which the mean-free path $\lambda$ is equal to the remaining tube length. With reference to this process it is found that the maximum obtainable beam intensity, taking into account the condition that molecules pass without collision through the constant density region which will exist in front of the effuser, is proportional to $$\sqrt{\frac{t}{dD}}$$

where $t$ is the transparency of the effuser defined as the ratio of open area to the total area $$\frac{\pi D^2}{4}$$

This discovery has led to substantial improvements in the construction of gas effusers so as to attain significantly higher beam intensities.

For a given diameter D, it is desired to optimize the ratio $t/d$. This requires that the tube wall thickness be as small as possible for tubes of a given diameter $d$. Where the wall thickness is limited by the process of construction, however, the ratio is optimized when $d$ is equal to the total wall thickness. Such an optimum configuration may be realized by utilizing the special properties of strength and flexibility found to exist with respect to very thin nickel-plated tungsten wire. In this case, thin strands of tungsten wire are plated with nickel to a minimum practical thickness, the diameter $d$ having been selected to be about twice said minimum thickness. These plated wires are sintered together into a bundle of a desired diameter D and then sliced into the desired lengths. Finally, the tungsten is etched out in a HCl bath leaving a honeycomb structure of nickel tubes. In an exemplary embodiment, 250 tubes of diameter $d=.001''$ and plating thickness $.0005''$ are contained in a $.026''$ long bundle of diameter $D=.030''$.

Another important result is that effusers of small diameter D, so-called point sources, will yield the greatest beam intensities. Indeed, it has been found that even a single hole effuser of $.004''$ diameter is a substantinal improvement over a multihole effuser of $.140''$ diameter. This also points up a very significant additional advantage in the nonuniform focuser of the present invention when it is recalled that maximum utilization of the effused beam is obtained with focusers of small entrance aperture. Thus the combination of a point source illuminating a nonuniform focuser permits, for example, a choice of either reducing the total gas flow for the same beam intensity, or achieving a higher beam intensity with the same gas flow. This has been verified in the actual operation of a 24 kmc. ammonium oscillator, the results of which are shown in FIG. 6. The lower curve was derived from an 8 pole uniform focuser having an interior diameter 2R of $.210''$ and an effuser diameter D of $.140''$. The upper curve was derived from a parabolic focuser of the type shown in FIGURE 3c wherein the interior diameter 2R was tapered from $.060''$ to $.300''$, the effuser diameter D being $.030''$. The applied focuser voltage in each case was 26 kv. and the length of the cavity resonator was six inches. In this instance it was possible to reduce the molecular flow by a factor of 8 for the same output power of four microwatts and to increase the maximum obtainable output power by a factor of 2.3.

In FIG. 7a there is shown a cross-sectional view of a lower state focuser in accordance with the present invention. This structure comprises a coaxial line structure having a voltage difference V applied between the inner conductor 11 and outer conductor 9 thereby producing a radially decreasing electric field in the annular region between the conductors. A substantial number of lower state molecules are deflected inwardly as indicated by the trajectory $m$ and would ultimately strike the inner conductor 11 if the focuser were sufficiently long. Suitable focusing is therefore effected by terminating the coaxial line at the proper distance L. Approximate calculations show that the beam transmission is optimized when the ratio between the outer radius $b$ and the inner radius $a$ is between 3 and 4 and the length L is given by $$\frac{b^2 v}{V}\sqrt{\frac{2C}{m}}$$

Again making the Maxwellian approximation $$v=\sqrt{\frac{2kT}{m}}$$

we have $$L=\frac{b^2}{V}\sqrt{\frac{kT}{C}}$$

In an exemplary embodiment used for the focusing of lower state ammonia molecules, $a=\frac{1}{16}''$, $b=\frac{1}{4}''$ and $L=4\frac{1}{2}''$ with a 20 kv. applied voltage. The outer conductor 9 is preferably made transparent to facilitate the defocusing of upper state molecules.

A long periodic focuser may be derived from the co- axial structure of FIG. 7a by cutting away the inner conductor at intervals of L units as shown in FIG. 7b. In this way it is possible to provide a structure of sufficient length to meet any given space and/or defocusing requirements. It should be noted in FIGS. 7a and 7b that the cut-away portions of the inner conductor are tapered to accommodate the molecular trajectories.

The use of the lower state focuser 8 in combination with ionization gauge 14 permits the monitoring of stimulated transition by means of the lower state beam flux indicated at 17, 17'. This indication is essentially frequency independent and so avoids the difficulties of detection by cavity coupling techniques, especially at high frequencies. For example, this combination provides a convenient means for observing transitions in the infrared region. Further, all the observed molecules have passed entirely through the cavity resonator. Since the narrowness of a resonance line at a particular resonant frequency is proportional to the amount of time spent by the molecules in the cavity, it is possible to obtain much higher resolution than that available in the case of detection by cavity coupling techniques which necessarily involve the observation of molecules which have passed only part way through the cavity. Thus the maser of the present invention may be used as an improved spectrometer, frequency stabilizer or other high resolution device.

Whereas the novel methods and apparatus of the present invention have been described with particular reference to ammonia molecules and more particularly with reference to the 24 kmc. transition thereof, it should be understood that the techniques of the present invention are applicable to other appropriate transitions, both in ammonia and other molecules including, for example, HCN, $CH_2O$ and other suitable diatomic, linear, symmetric-top, or asymmetric-top molecules.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for transforming a molecular beam of divergence $\Omega_1$ and cross-sectional dimension $2R_1$ into a beam of divergence $\Omega_2$ and cross-sectional dimension $2R_2$ such that $R_1^2\Omega_1=R_2^2\Omega_2$ which comprises means for directing the beam into a focusing field extending transverse to the beam axis for a distance 2R and having a monotonic radial variation which establishes a potential energy barrier $\Delta W$, and means for adiabatically varying said field along said beam axis from an initial condition $2R_1$, $\Delta W_1$ to a final condition $2R_2$, $\Delta W_2$ where $\Delta W_1$ and $\Delta W_2$ are the potential energy barriers associated with a uniform focusing field having beam capture angle $\Omega_1$ and $\Omega_2$, respectively.

2. The apparatus of claim 1 wherein the variation of focusing period $T_0$ with respect to the time $t$ elapsed after a molecule enters the focusing field is given by $$\frac{dT_0}{dT}\leq 2\pi$$

3. Apparatus for transforming a molecular beam of divergence $\Omega_1$ and cross-sectional radius $R_1$ into a beam of divergence $\Omega_2$ and cross-sectional radius $R_2$ such that $R_1^2\Omega_1=R_2^2\Omega_2$ which comprises means for directing the beam into a multipole electric field having a maximum field strength E at a distance R from the beam axis, and means for adiabatically varying said field strength along the beam direction from an initial value $E_1$ at distance $R_1$ to a final value $E_2$ at distance $R_2$ where $E_1$ and $E_2$ are the strengths of an uniform multipole field having a beam capture angle $\Omega_1$ and $\Omega_2$, respectively.

4. Apparatus for transforming a molecular beam having divergence $\Omega_1$ and cross-sectional radius $R_1$ into a beam of divergence $\Omega_2$ and cross-sectional radius $R_2$ such that $R_1{}^2\Omega_1 = R_2{}^2\Omega_2$ comprising an even number $2n$ of focusing rods symmetrically disposed about the beam axis $z$, the distance R from each of said rods to the beam axis varying from an initial value $R_1$ to a final value $R_2$, and means for applying a voltage difference V of alternating sign between adjacent rods, the variation in R being such that maximum electric field strength varies adiabatically along the beam axis.

5. Apparatus according to claim 4 wherein the distance R varies in accordance with the inequality $$\frac{d}{dz}R^2 \leq \frac{nV}{2}\sqrt{\frac{C}{kT}}$$

where C is the second order Stark effect coefficient of the molecules, $k$ is Boltzmann's constant and T is the absolute temperature of the beam source.

6. Apparatus according to claim 5 wherein the variation in R is parabolic.

7. Apparatus according to claim 6 wherein the focusing rods extend in the $z$ direction for a distance at least equal to $$\frac{2}{n}\frac{R_2{}^2 - R_1{}^2}{V}\sqrt{\frac{kT}{C}}$$

8. Apparatus according to claim 5 wherein the variation in R is linear.

9. Apparatus according to claim 8 wherein the focusing rods extend in the $z$ direction for a distance at least equal to $$\frac{4}{n}\frac{R_2(R_2 - R_1)}{V}\sqrt{\frac{kT}{C}}$$

10. Apparatus according to claim 4 wherein the cross-sectional radius $r$ of each focuser rod varies along the beam axis in accordance with the relation $$r = \frac{R}{n-1}$$

11. In a molecular beam maser the combination comprising a point source gas effuser for forming a molecular beam, a cavity resonator into which said beam is directed, and means for producing a nonuniform focusing field diverging from a position directly adjacent said effuser to said cavity resonator, said focusing means selecting a nonequilibrium population of upper state molecules from said beam which may undergo stimulated transitions in said cavity resonator.

12. The combination of claim 11 wherein said focusing means comprises a plurality of focusing rods disposed about the beam axis, the distance from each of said rods to said axis diverging from said effuser to said cavity.

13. The combination of claim 12 further comprising means for applying a voltage difference V of alternating sign between adjacent rods, the distance from said rods to said axis diverging to a value $R_2$ approximately equal to the cross-sectional radius of said cavity resonator over a distance which is greater than about $$\frac{R_2{}^2}{V}\sqrt{\frac{kT}{C}}$$

where C is the second order Stark effect coefficient of the molecules, $k$ is Boltzmann's constant and T is the absolute temperature of the beam source.

14. Apparatus for supporting high voltage rods in a vacuum housing which comprises a plurality of spaced metallic washers, a plurality of glass rods interconnecting said washers, said rods being fused to metallic springs extending from said washers, and a plurality of radially extending fins attached to said rods and interchangeably engaging said washers in radial slots at the inner edges thereof, said glass rods providing a long leakage path for high voltages which may be applied between said washers.

15. Apparatus for selecting lower state molecules from a molecular beam which comprises an inner conductor and an outer conducting structure radially spaced therefrom with an effective radius $b$, said inner conductor being cut away at an interval L from the beam entrance end thereof to permit axial passage of said molecules, and means for applying a voltage difference V between said inner conductor and said outer conductor whereby lower state molecules are inwardly deflected, said interval L being substantially equal to $$\frac{b^2v}{V\sqrt{\frac{2C}{m}}}$$

where C is the second order Stark effect coefficient of the molecules, $m$ is the molecular mass, and $v$ is the velocity of molecules in the $z$ direction.

16. Apparatus according to claim 15 wherein said outer conducting structure is provided with passage means for permitting the defocusing of upper state molecules therethrough.

17. The apparatus of claim 15 wherein said inner conductor extends for a single interval L.

18. The apparatus of claim 15 wherein said inner conductor extends for a plurality of intervals L.

19. The apparatus of claim 15 wherein said inner and outer conductors form a coaxial line and the ratio $b/a$ between the outer radius of said line and the inner radius is selected from a range of values extending from about 3 to about 4.

20. A molecular beam maser comprising means for forming a beam of upper and lower state molecules, means for effecting stimulated transitions of upper state molecules to lower state molecules, means for selecting lower state molecules from the beam after it has passed through said stimulated transition means, means for directing said selected lower state molecules into a beam flux detection region, and means located in said last-named region for detecting the flux of said selected lower state molecules as an indication of said stimulated transitions.

21. Apparatus according to claim 20, wherein said beam directing means comprises a long tube for reducing the background pressure in said detector.

22. Apparatus according to claim 21 further including means for cooling the mouth of said tube so as to freeze out condensable molecules.

23. Apparatus according to claim 20 wherein said beam flux detection means comprises a glow discharge chamber into which said selected beam may pass and means for detecting the discharge current in said chamber.

24. Apparatus according to claim 23 wherein said means for selecting lower state molecules comprises an inner conductor and an outer conductor provided with passage means for permitting the defocusing of upper state molecules therethrough.

25. Apparatus according to claim 23 wherein said glow discharge chamber comprises a pair of cathodes between which is positioned a cellular anode.

26. Apparatus according to claim 25 wherein at least one of said cathodes is made of a reactive material such that positive ions impinging thereon cause a sputtering of said reactive material on the interior surfaces of said chamber thereby enabling the entrapment of gas molecules and improving the vacuum within said maser.

27. Apparatus according to claim 25 wherein said means for detecting the discharge current comprises current indicating means connected between at least one of said cathodes and the grounded housing of said discharge chamber.

28. In a molecular beam maser the combination comprising a point source gas effuser for forming a molecular beam, means for selecting upper state molecules comprising a plurality of focusing rods disposed about the beam axis and diverging from said effuser, a cavity resonator within which said molecules may undergo stimulated transitions positioned adjacent the downstream end of said upper state selection means, means for selecting lower state molecules leaving the cavity resonator comprising an inner conductor and an outer conductor provided with passage means for permitting the defocusing of upper state molecules therethrough, and beam flux detecting means positioned downstream from said lower state selection means for monitoring the stimulated transitions in said cavity resonator.

29. The combination of claim 28 wherein said point source effuser comprises a bundle of tubes having a minimum practical wall thickness, the diameter of said tubes being about twice said minimum wall thickness.

30. The combination of claim 29 further including means for supporting said focusing rods comprising a plurality of spaced metallic washers, a plurality of glass rods interconnecting said washers, said rods being fused to metallic springs extending from said washers, and a plurality of radially extending fins attached to said rods and interchangeably engaging said washers in radial slots at the inner edges thereof, said glass rods providing a long leakage path for high voltages which may be applied between said washers.

31. The combination of claim 29 wherein said tube walls are made by etching a bundle of plated wires.

32. The combination of claim 31 wherein said wire material is tungsten and said plating material is nickel.

References Cited by the Examiner
UNITED STATES PATENTS

| | | | |
|---|---|---|---|
| 2,338,507 | 1/44 | Haas et al. | 29—25.15 |
| 2,407,742 | 9/46 | Harries | 29—25.16 |
| 2,412,359 | 12/46 | Roper | 250—41.93 |
| 2,534,775 | 1/51 | MacNeille | 324—33 |
| 2,808,510 | 10/57 | Norton | 315—5 X |
| 2,837,693 | 6/58 | Norton. | |
| 2,851,652 | 9/58 | Dicke | 330—4 |
| 2,879,439 | 3/59 | Townes | 315—5 |
| 2,897,437 | 7/59 | Briggs et al. | 324—33 |
| 2,915,709 | 12/59 | Pannaci et al. | 330—4 X |
| 2,933,646 | 4/60 | Reder | 330—4 X |
| 2,956,238 | 10/60 | Reder | 330—4 X |

OTHER REFERENCES

Physical Review, vol. 99, No. 4, August 1955, The Maser, by Gordon et al., pages 1264 to 1274.

Journal of Applied Physics, vol. 28, No. 2, pages 212 to 215, February 1957, Maser Oscillations, by J. C. Helmer.

ARTHUR GAUSS, *Primary Examiner.*